(12) United States Patent
Pak et al.

(10) Patent No.: US 12,022,010 B2
(45) Date of Patent: Jun. 25, 2024

(54) REDUCED BANDWIDTH HANDSHAKE COMMUNICATION

(71) Applicants: ARM Ltd, Cambridge (GB); ARM IP Limited, Cambridge (GB)

(72) Inventors: Yongbeom Pak, Oulu (FI); Hannes Tschofenig, Tirol (AT)

(73) Assignees: ARM LIMITED, Cambridge (GB); ARM IP LIMITED, Cambridge (GB)

( * ) Notice: Subject to any disclaimer, the term of this patent is extended or adjusted under 35 U.S.C. 154(b) by 185 days.

(21) Appl. No.: 16/492,757

(22) PCT Filed: Mar. 26, 2018

(86) PCT No.: PCT/GB2018/050786
§ 371 (c)(1),
(2) Date: Sep. 10, 2019

(87) PCT Pub. No.: WO2018/189507
PCT Pub. Date: Oct. 18, 2018

(65) Prior Publication Data
US 2020/0015087 A1 Jan. 9, 2020

(30) Foreign Application Priority Data

Apr. 13, 2017 (GB) .................................... 1705950

(51) Int. Cl.
*H04L 9/32* (2006.01)
*H04L 9/06* (2006.01)
(Continued)

(52) U.S. Cl.
CPC .......... *H04L 9/3268* (2013.01); *H04L 9/0643* (2013.01); *H04W 4/70* (2018.02);
(Continued)

(58) Field of Classification Search
CPC . H04L 9/32; H04L 9/3268; H04L 9/06; H04L 9/0643; H04L 67/02; H04L 67/32;
(Continued)

(56) References Cited

U.S. PATENT DOCUMENTS 6,324,648 B1 * 11/2001 Grantges, Jr. ........... H04L 67/02
713/168
7,136,932 B1 * 11/2006 Schneider ............. H04L 61/301
709/217
(Continued)

FOREIGN PATENT DOCUMENTS

CA 2479626 C * 6/2010 ............. H04L 12/58
CN 101127604 2/2008
(Continued)

OTHER PUBLICATIONS

Uniform Resource Identifier (URI): Generic Syntax By T. Berners-Lee, R. Fielding and L. Masinter pp. 61; Jan. 2005.*
(Continued)

*Primary Examiner* — Harunur Rashid
*Assistant Examiner* — Ali H. Cheema
(74) *Attorney, Agent, or Firm* — NIXON & VANDERHYE, P.C.

(57) ABSTRACT

Broadly speaking, embodiments of the present technique provide methods, apparatuses and systems for performing a TLS/DTLS handshake process between machines in a manner that reduces the amount of data sent during the handshake process.

17 Claims, 8 Drawing Sheets

(51) Int. Cl.
| | |
|---|---|
| *H04W 4/70* | (2018.01) |
| *H04W 12/03* | (2021.01) |
| *H04W 12/069* | (2021.01) |
| *H04W 12/088* | (2021.01) |
| *H04W 12/50* | (2021.01) |
| *H04L 9/40* | (2022.01) |
| *H04W 12/06* | (2021.01) |

(52) U.S. Cl.
CPC ......... *H04W 12/03* (2021.01); *H04W 12/069* (2021.01); *H04W 12/088* (2021.01); *H04W 12/50* (2021.01); *H04L 9/3263* (2013.01); *H04L 63/0823* (2013.01); *H04W 12/06* (2013.01)

(58) Field of Classification Search
CPC . H04L 67/2838; H04L 63/029; H04L 9/3273; H04L 9/3215; H04L 9/3263; H04L 63/0823; H04W 4/70; H04W 12/088; H04W 12/50; H04W 12/03; H04W 12/069; H04W 12/06
USPC ................. 726/2, 7, 10; 713/156, 158, 176; 709/219, 227
See application file for complete search history.

(56) References Cited

U.S. PATENT DOCUMENTS

| | | | | |
|---|---|---|---|---|
| 8,181,227 | B2* | 5/2012 | Lau | H04L 63/0823 713/175 |
| 8,281,035 | B2* | 10/2012 | Farber | H04L 67/1006 709/219 |
| 8,413,229 | B2* | 4/2013 | Mullick | H04L 67/1008 713/184 |
| 8,547,965 | B2* | 10/2013 | Lu | H04L 61/4557 370/352 |
| 8,856,259 | B2* | 10/2014 | Burckart | H04L 67/02 709/227 |
| 9,015,284 | B2* | 4/2015 | Ukkola | H04W 4/70 709/219 |
| 9,762,444 | B1* | 9/2017 | Kim | H04L 63/0823 |
| 10,142,329 | B1* | 11/2018 | Liu | H04L 65/1069 |
| 10,374,809 | B1* | 8/2019 | Dasarakothapalli | H04W 9/30 |
| 2002/0073310 | A1* | 6/2002 | Benantar | H04L 9/3268 713/156 |
| 2003/0097592 | A1 | 5/2003 | Adusumilli | |
| 2003/0115342 | A1* | 6/2003 | Lortz | H04L 63/0823 709/229 |
| 2003/0177351 | A1* | 9/2003 | Skingle | H04L 63/0823 713/156 |
| 2004/0030887 | A1* | 2/2004 | Harrisville-Wolff | H04L 63/08 713/155 |
| 2004/0054598 | A1* | 3/2004 | Kall | H04L 67/16 455/411 |
| 2005/0278534 | A1* | 12/2005 | Nadalin | H04L 9/3263 713/175 |
| 2006/0080534 | A1* | 4/2006 | Yeap | H04W 12/069 713/176 |
| 2006/0167841 | A1* | 7/2006 | Allan | H04L 67/02 |
| 2008/0016335 | A1* | 1/2008 | Takahashi | H04L 9/3263 713/156 |
| 2008/0040508 | A1* | 2/2008 | Rosenberg | H04L 65/80 709/239 |
| 2008/0077796 | A1* | 3/2008 | Lund | H04L 9/3273 713/173 |
| 2008/0091831 | A1* | 4/2008 | Rosenberg | H04L 69/40 709/227 |
| 2010/0138899 | A1* | 6/2010 | Yamamoto | G06F 21/31 709/229 |
| 2010/0278322 | A1* | 11/2010 | Krantz | H04M 3/382 379/93.03 |
| 2011/0047373 | A1* | 2/2011 | Karasawa | H04L 9/3268 713/155 |
| 2011/0087882 | A1* | 4/2011 | Kuo | H04L 9/006 713/156 |
| 2011/0196978 | A1* | 8/2011 | Toyama | H04L 67/535 709/229 |
| 2011/0213969 | A1* | 9/2011 | Nakhjiri | H04L 9/3213 713/158 |
| 2012/0054106 | A1* | 3/2012 | Stephenson | H04L 63/12 705/50 |
| 2012/0226908 | A1* | 9/2012 | Mokrushin | H04L 63/0815 713/168 |
| 2013/0042316 | A1* | 2/2013 | Lappetelainen | H04W 48/18 726/10 |
| 2014/0094119 | A1 | 4/2014 | Stojanovski et al. | |
| 2014/0223182 | A1* | 8/2014 | Avanzi | H04L 63/0869 713/168 |
| 2014/0237522 | A1* | 8/2014 | Rothschild | H04N 21/23805 725/88 |
| 2014/0289831 | A1* | 9/2014 | Prakash | H04L 63/0876 726/7 |
| 2015/0156194 | A1* | 6/2015 | Modi | H04L 67/568 713/158 |
| 2015/0186845 | A1* | 7/2015 | Dale | H04L 9/3215 709/206 |
| 2015/0188712 | A1* | 7/2015 | Teuwen | H04L 9/3236 713/176 |
| 2015/0334110 | A1* | 11/2015 | Bishop | H04L 9/3215 713/156 |
| 2016/0162838 | A1* | 6/2016 | Torkian | H04L 9/3215 709/206 |
| 2017/0006030 | A1* | 1/2017 | Krishnamoorthy | H04L 63/0823 |
| 2017/0012780 | A1* | 1/2017 | Kaliski, Jr. | H04L 61/4552 |
| 2017/0026185 | A1* | 1/2017 | Moses | H04L 9/0833 |
| 2017/0039373 | A1 | 2/2017 | Sasin et al. | |
| 2017/0149571 | A1 | 5/2017 | Sun | |
| 2017/0149783 | A1* | 5/2017 | Dayka | H04L 63/10 |
| 2017/0272256 | A1* | 9/2017 | Yang | H04L 63/0823 |
| 2017/0279619 | A1* | 9/2017 | Yang | H04L 9/3268 |
| 2018/0191740 | A1* | 7/2018 | Decenzo | H04L 63/02 |
| 2018/0278611 | A1* | 9/2018 | Tan | H04L 9/3268 |

FOREIGN PATENT DOCUMENTS

| | | | | |
|---|---|---|---|---|
| CN | 102916811 | | 2/2013 | |
| CN | 104618117 | A * | 5/2015 | |
| CN | 105765944 | A * | 7/2016 | ......... G06F 21/335 |
| CN | 105830389 | A * | 8/2016 | ............ G06F 21/41 |
| CN | 105871797 | | 8/2016 | |
| CN | 106533689 | | 3/2017 | |
| EP | 1 352 534 | | 10/2003 | |
| EP | 1 521 426 | | 4/2005 | |
| GB | 2529838 | | 3/2016 | |
| GB | 2558205 | | 7/2018 | |
| JP | 2008079091 | A * | 4/2008 | ......... H04L 63/0823 |
| KR | 10-2011-0058908 | | 6/2011 | |
| KR | 20120007520 | A * | 1/2012 | ......... H04L 63/0823 |
| KR | 10-1635244 | | 6/2016 | |
| WO | WO-2010126800 | A3 * | 11/2010 | ......... H04L 63/0823 |
| WO | WO-2014174491 | A1 * | 10/2014 | ........... G06F 16/951 |
| WO | WO 2016/033764 | | 3/2016 | |

OTHER PUBLICATIONS

Use of Device Identity in HTTP-Enabled Location Delivery (HELD) By J. Winterbottom; M. Thomson; H. Tschofenig; R. Barnes pp. 27; Mar. 2011.*

On the Leakage of Personally Identifiable Information Via Online Social Networks By Balachander Krishnamurthy and Craig E. Wills pp. 6; Aug. 17, 2009.*

A Messy State of the Union: Taming the Composite State Machines of TLS By Benjamin Beurdouche, Karthikeyan Bhargavan, Antoine Delignat-Lavaud, Cédric Fournet, Markulf Kohlweiss, Alfredo Pironti, Pierre-Yves Strub, and Jean Karim Zinzindohoue pp. 9; Feb. 2017.*

(56) References Cited

OTHER PUBLICATIONS

International Search Report and Written Opinion of the ISA for PCT/GB2018/050786, dated May 16, 2018, 19 pages.
Combined Search and Examination Report for GB1705950.2, dated Oct. 16, 2017, 6 pages.
Examination Report for GB1705950.2, dated May 17, 2019, 3 pages.
Office Action issued in CN201880021804.6, dated Feb. 7, 2022, 22 pages.
Examination Report issued in IN201947037218 dated Feb. 3, 2022, 8 pages.
Office Action issued in KR10-2019-7027881, dated Sep. 26, 2022, with English Translation 22 pages.

* cited by examiner

Server and Device Handshake

REDUCED BANDWIDTH HANDSHAKE COMMUNICATION

CROSS-REFERENCES TO RELATED APPLICATIONS

This application is the U.S. national phase of International Application No. PCT/GB2018/050786 filed 26 Mar. 2018, which designated the U.S. and claims priority to GB Patent Application No. 1705950.2 filed 13 Apr. 2017, the entire contents of each of which are hereby incorporated by reference.

BACKGROUND OF THE INVENTION

The present techniques generally relate to methods, apparatuses and systems for enabling communication between devices, and in particular to a reduced bandwidth handshake communication technique between devices.

SUMMARY OF THE INVENTION

There are ever increasing numbers of devices within the home, other buildings, vehicles and the outdoor environment, as well as personal devices, which have the processing and communication capabilities to enable them to communicate with other devices (e.g. end-point devices, servers, etc.) within the same network or in a different network to access services as part of the "Internet of Things" (IoT).

For example, a temperature device in the home may gather sensed data and push the sensed data to a remote service (such as an application running in 'the cloud'). The temperature device may then be controlled remotely by the remote service via received command data. In other examples, a factory pollution monitoring sensor may gather information from various chemical sensors and arrange maintenance based on the gathered information; whilst a healthcare provider may use wireless sensors, such as a heart rate monitor to track the health of patients while they are at home. Such devices are used in a range of networks, whereby the data is generally transmitted between devices and/or services using machine-to-machine (M2M) communication techniques.

M2M communication techniques typically need to be secure, for example, because sensitive data may be transmitted between devices to servers, and/or because unsecure communication may enable malicious third parties to gain access to the machines or to the data being transmitted between machines. M2M communications may be secured using cryptographic protocols, such as the Transport Layer Security (TLS) protocol or the Datagram Transport Layer Security (DTLS) protocol, which are designed to prevent eavesdropping, tampering or message/data forgery. The TLS/DTLS protocol requires machines that seek to communicate with each other (e.g. end-point devices and servers) to authenticate each other by exchanging and validating digital certificates in a handshake process. However, the handshake process usually requires a large amount of data to be sent between the machines.

The present applicant has recognised the need for improved techniques to secure communications.

DETAILED DESCRIPTION

According to a first aspect of the present techniques, there is provided a method of establishing a secure communication session between a client device and a server, the method performed by the client device comprising: receiving, at the client device, a request from the server for a first digital certificate for authenticating the client device to the server, the first digital certificate comprising a client device identifier, a server identifier and a further identifier identifying a relationship between the client device and the server; transmitting, to the server in response to the request, a uniform resource identifier (URI) for the first digital certificate.

According to a second aspect of the present techniques, there is provided a method of establishing a secure communication session between a client device and a server, the method performed by the server comprising: transmitting, from the server, a request to the client device for a first digital certificate for authenticating the client device, the first digital certificate comprising a client device identifier, a server identifier and a further identifier identifying a relationship between the client device and the server; receiving, at the server, a client device identifier and a uniform resource identifier (URI) for the first digital certificate from the client device.

According to a third aspect of the present techniques, there is provided a client device (e.g. constrained resource device) comprising: storage for storing a first digital certificate for authenticating the client device to a server, the first digital certificate comprising a client device identifier, a server identifier and a further identifier identifying a relationship between the client device and the server; processing circuitry for generating a uniform resource identifier (URI) for the first digital certificate; and communication circuitry for: receiving, from the server, a request for the first digital certificate; and transmitting, responsive to the request, the URI for the first digital certificate.

According to a fourth aspect of the present techniques, there is provided a non-transitory data carrier carrying code which, when implemented on a processor, causes the processor to carry out any of the methods described herein.

According to a fifth aspect of the present techniques, there is provided a method of establishing a secure communication session between a client device and a server, the method comprising: transmitting, from the server to the client device, a request from the server for a first digital certificate for authenticating the client device to the server, the first digital certificate comprising a client device identifier, a server identifier and a further identifier identifying a relationship between the client device and the server; transmitting, from the client device to the server, a uniform resource identifier (URI) for the first digital certificate; transmitting, from the client device to the server, a request for a second digital certificate for authenticating the server to the client device, the second digital certificate comprising the server identifier; and transmitting, from the server to the client device, fingerprint data corresponding to the second digital certificate.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

BRIEF DESCRIPTION OF THE DRAWINGS

The techniques are diagrammatically illustrated, by way of example, in the accompanying drawings, in which.

DETAILED DESCRIPTION OF THE DRAWINGS

Figure 1:
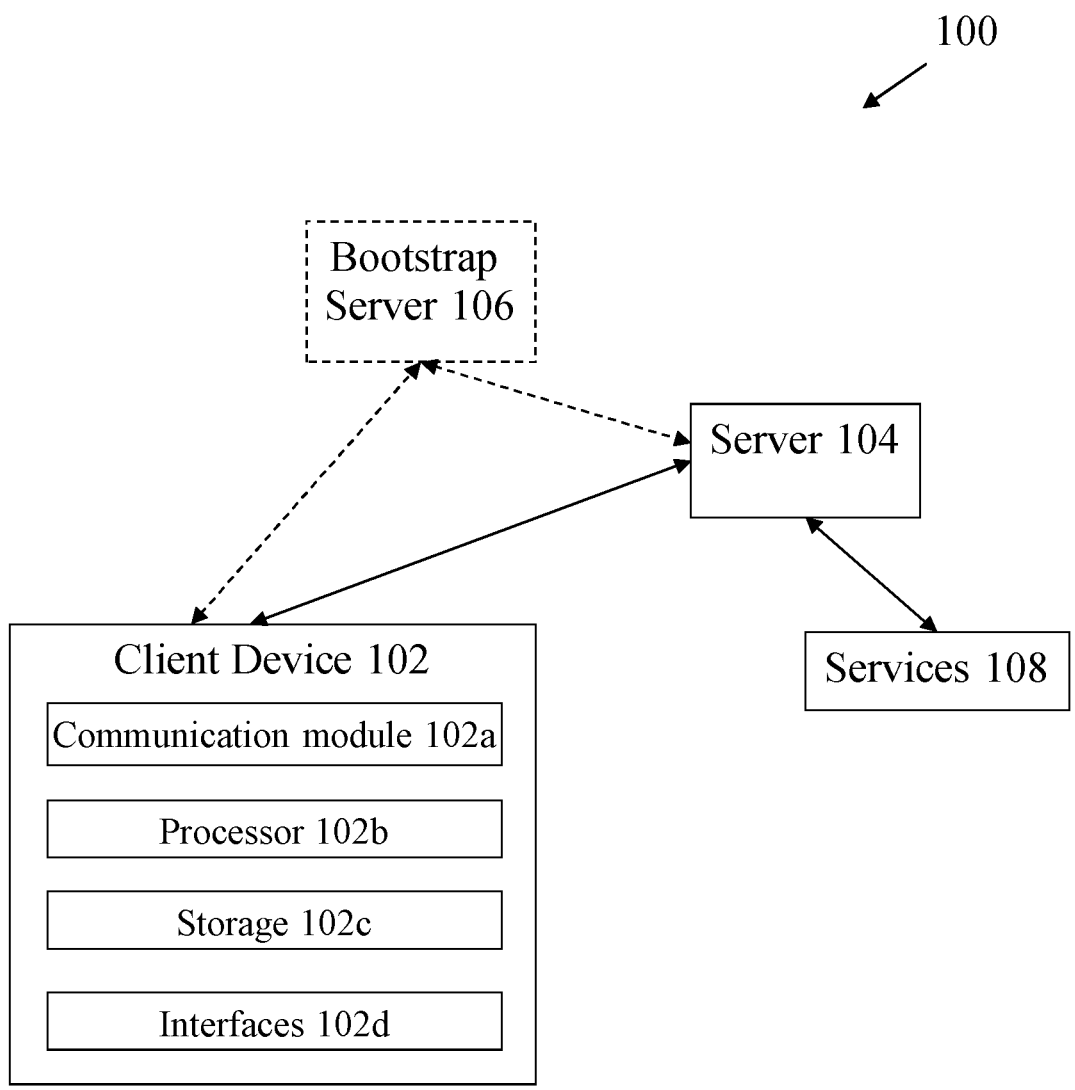
FIG. 1 shows a block diagram of a system comprising a client device, server and bootstrap server.

Broadly speaking, embodiments of the present technique provide methods, apparatuses and systems for performing a TLS/DTLS handshake process between machines in a manner that reduces the amount of data sent during the handshake process.

As mentioned briefly above, machine to machine (M2M) communication techniques typically need to be secure to reduce the risk that malicious third parties gain access to the machines, or to limit the access of each machine to particular data, machines or services. M2M communications may be secured using cryptographic protocols, such as the Transport Layer Security (TLS) protocol or the Datagram Transport Layer Security (DTLS) protocol, which are designed to prevent eavesdropping, tampering or message/data forgery. The TLS and DTLS protocols require machines that seek to communicate with each other (e.g. client devices and servers) to authenticate each other by exchanging and validating digital certificates in a handshake process, before any other communication/message exchange can begin. However, the handshake process usually requires a large amount of data to be sent between the machines.

The TLS/DTLS protocol may be used to secure communication between an Internet of Things (IoT) device (also referred to herein as a client device, or client) and a remote or cloud-based server, for example. In this case, during the handshake process, the client device and server exchange their public key certificates (also known as, and referred to herein, as digital certificates or identity certificates). Digital certificates are electronic documents used to prove the ownership of a public key that is used as part of an asymmetric key algorithm (i.e. which forms part of a public-private key pair). A digital certificate typically comprises information about the public key, information about the identity of its owner (e.g. the client device or server), and the digital signature of an issuing entity that has verified the contents of the certificate (e.g. a trusted third party such as a certificate authority). A digital certificate can be large, particularly if it comprises a certificate chain, or if each certificate is an RSA certificate (i.e. where a public key is based on two large prime numbers). For example, a single RSA-based certificate containing a 2048-bit key may be at least 1024 bytes in size. Similarly, at least the first time a TLS/DTLS handshake is performed between a client device and a server, the client device and server need to decide on which cryptographic algorithm(s) or ciphers or cipher suites they will use to secure communication sessions. For example, the client device may send a list of cipher suites that it supports, potentially in order of preference. The server selects a cipher suite from the list and informs the client device of this selection. The list of cipher suites may be large, which increases the amount of information sent between machines during a TLS/DTLS handshake. This means that every time a client device and a server perform a handshake process to begin a secure communication session (i.e. a session during which the client device and server exchange encrypted messages), large amounts of data may need to be exchanged.

The exchange of certificates in a handshake process may be problematic in an Internet of Things environment in which client devices or end-user devices tend to be low-power, low-memory, and/or low-processing power devices. Client devices/end-user devices may have intermittent connectivity with a network in which they are operational, or with an external network, or other devices within a network. For example, client devices may not have good connectivity with the other devices/machines or the Internet, because this may consume resources of the client devices (e.g. power or memory). More generally, the exchange of certificates in a TLS/DTLS handshake process may be problematic in any scenario in which the client device is a constrained resource device. Accordingly, the techniques described herein remove the need to transmit certificates during a handshake process. The techniques described herein may remove the need to transmit a list of algorithms/cipher suites during a handshake process. The techniques described herein may optimise a TLS/DTLS handshake process, such that the handshake process is more efficient and requires less data to be transmitted. This may be useful for constrained resource devices and/or in systems where machines may only be able to transmit/receive a limited amount of data. The optimised handshake process is described in more detail below with reference to the Figures.

FIG. 1 shows a block diagram of a system 100 comprising a client device 102 and a server 104 which may securely communicate with each other. The system 100 may, in embodiments, comprise a bootstrap server 106. The system 100 may comprise multiple client devices and/or multiple servers, but only a single client device and a single server is shown for the sake of simplicity. Client device 102 may also be referred to herein as a 'device', 'client', 'node device', 'node', 'end-user device' or 'user device'. The client device 102 may be a computer (e.g. a PC), a laptop, a tablet computer, a mobile phone, a 'smart object' or Internet of Things object. In embodiments, the client device 102 may be a device which is able to turn electronic objects into 'smart objects' that may form part of the Internet of Things, such as smart streetlights, electricity meters, temperature sensors, etc. It will be appreciated that these are merely example smart objects provided for illustrative purposes, and are non-limiting.

Each client device 102 may require access to one or more services 108 that are accessed via server 104. Each client device 102 comprises a communication module 102a, to enable the client device 102 to communicate with other machines, such as bootstrap server 106 or server 104, or with other client devices. Typically, the other machines are located remote to the client device 102. The communication module 102a may be any suitable communication module, comprising any suitable communication circuitry and using any suitable communication protocols, to transmit and receive messages (or data or data packets). The communication module 102a may use any suitable communication protocol to communicate with other machines, such as, but not limited to, wireless communication (e.g. WiFi), short range communication such as radio frequency communication (RFID) or near-field communication (NFC), or by using the communication protocols specified by ZigBee, Thread, Bluetooth™ Bluetooth™ LE, IPv6 over Low Power Wireless Standard (6LoWPAN), or Constrained Application Protocol (CoAP). The communication module 102a may use a wireless mobile (cellular) telecommunication protocol to communicate with remote machines, e.g. 3G, 4G, 5G, etc. The client device 102 may communicate with remote machines using wired communication techniques, such as via metal cables or fibre optic cables. The client device 102 may use more than one communication technique to communicate with remote machines.

The client device 102 comprises a processor or processing circuitry 102b. Processor 102b controls various processing operations performed by client device 102, such as verifying a digital certificate and authenticating a machine which attempts to communicate with client device 102. The processor 102b may comprise processing logic to process data (e.g. data signals and data packets received from other machines within system 100), and generate output data in response to the processing. The processor 102b may comprise one or more of: a microprocessor, a microcontroller, and an integrated circuit.

Client device 102 comprises storage 102c. Storage 102c may comprise a volatile memory, such as random access memory (RAM), for use as temporary memory, and/or non-volatile memory such as Flash, read-only memory (ROM), or electrically erasable programmable ROM (EEPROM), for storing data, programs or instructions. Storage 102c may store credentials that are provided during the manufacturing process to fabricate client device 102, such as a digital certificate for the client device 102 (which comprises information about the client device's public key), also referred to herein as Cert(C), and a private key of a public-private key pair, also referred to herein as Priv(C). Storage 102c may be used to store additional keys and digital certificates, as well as information used to verify/authenticate server 104—this is described in more detail with respect to FIG. 7.

Client device 102 comprises one or more interfaces 102d that enable the device 102 to receive inputs (e.g. sensed/measured data), and/or generate outputs (e.g. audio and/or visual outputs, or control commands, etc.)

Client device 102 may communicate with server 104 using appropriate communication standards/protocols. It will be understood that intermediary devices (such as a gateway) may be located between device 102 and sever 104, to facilitate communication between the machines.

Client device 102 may, in embodiments, be an Internet of Things (IoT) device or a constrained resource device. Server 104 may be a lightweight machine-to-machine server (LWM2M server), such that the server 104 and client device 102 communicate using the Open Mobile Alliance (OMA) LWM2M protocol, or other LWM2M protocol. Server 104 may be an OMA Device Management (DM) server, such that the server 104 and client device 102 communicate using the OMA DM communication protocol. Server 104 may be a TR-069 server (which is a bidirectional SOAP/HTTP-based protocol), such that server 104 and client device 102 communicate using the CPE WAN Management protocol (CWMP) published by the Broadband Forum. Server 104 may be a server which follows a standard/protocol set by the Open Connectivity Foundation or Open Interconnect Consortium.

Server 104 may communicate with services 108 which may, for example, be part of a private cloud or public cloud environment on the internet, or which may be hosted on server 104. The services 108 may provide different types of services such as data storage, data analytics, data management, application services, etc. It will be understood these listed services are merely examples and are non-limiting.

Client device 102 and server 104 may communicate with bootstrap server 106. In embodiments, server 106 may be any type of server or remote machine, and may not necessarily be a dedicated bootstrap server. Generally speaking the bootstrap server 106 is any means (e.g. machine, hardware, technology, server, software, etc.) which may be able to provide data to client device 102 and/or server 104 (e.g. may be able to provide credentials). In embodiments, server 104 may be a bootstrap server. Bootstrap server 106 may be used to provision client device 102 with the required information to enable client device 102 to undertake a TLS/DTLS handshake process with server 104. Bootstrap server 106 may comprise a database of all machines which are registered with the bootstrap server, together with information on the permissions/access any particular machine should have, and which details a machine has, and may require, to communicate with other machines. In embodiments, as described below with respect to FIG. 8, bootstrap server 106 may not be required to provision client device 102 with any required credentials.

In embodiments, the client device 102 may be a constrained resource device which uses a lightweight machine-to-machine protocol (LWM2M) to communicate with other machines. Server 104 may be an LWM2M server. LWM2M protocols may utilise bootstrapping techniques to provision the client device 102 with required information, e.g. credentials for TLS/DTLS handshakes. The bootstrapping techniques may comprise a 'factory bootstrap', in which information (e.g. credentials) is hardcoded into the client device 102 during manufacture. The factory bootstrap may comprise adding one or more credentials required by client device 102 to communicate with other devices (e.g. server 104), or may comprise adding the information required for client device 102 to reach a bootstrap server (which may provide any missing information required by the client device 102 to communicate with other devices). It will be understood that any suitable technique to provision the client device 102 with credentials may be used instead of, or in addition to, the provisioning techniques mentioned herein.

Figure 7:
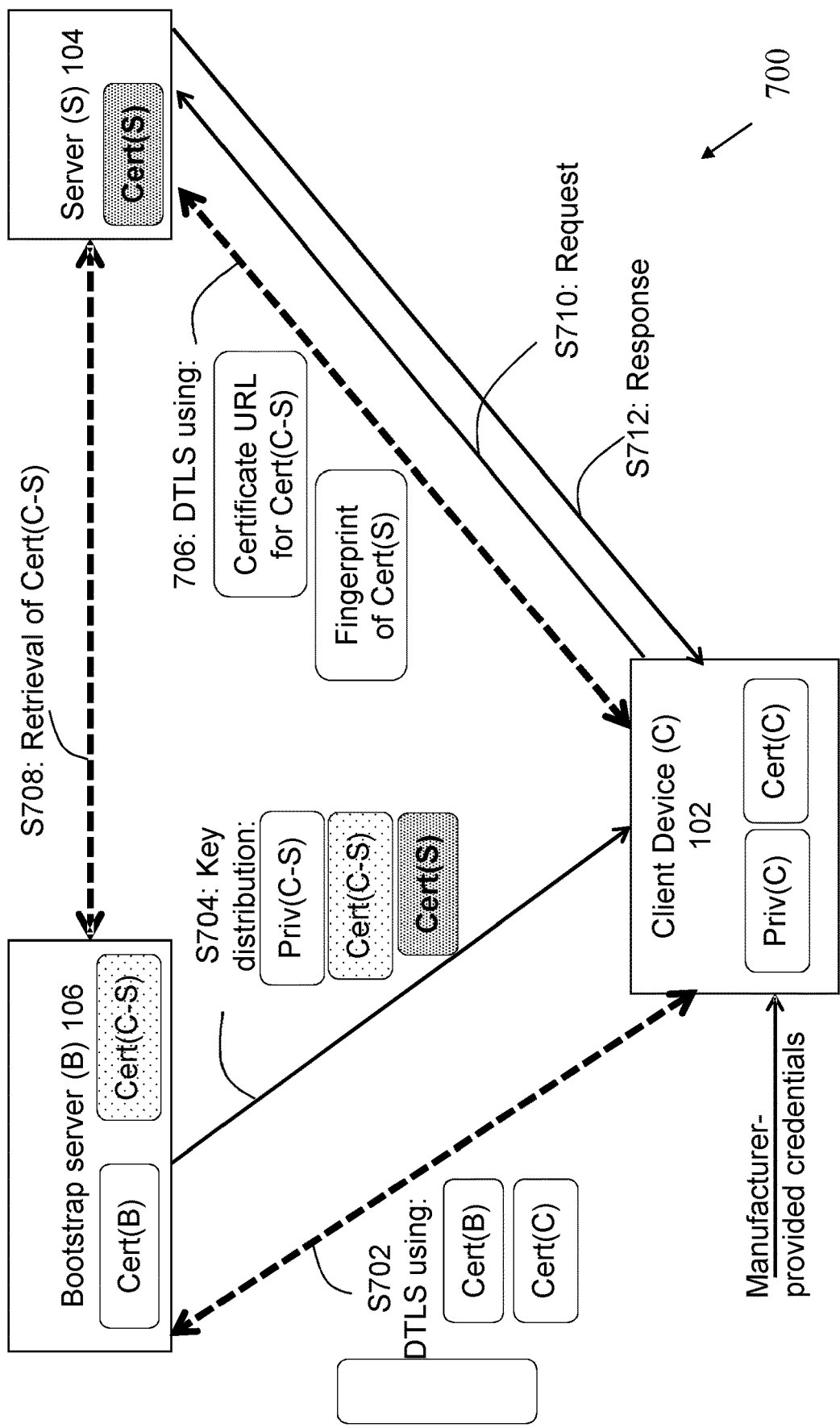
FIG. 7 is a block diagram of the system of FIG. 1 showing example steps to perform an improved handshake between client device and server.

FIG. 7 is a block diagram of the system of FIG. 1 showing example steps to perform an improved handshake between client device and server. Accordingly, like reference numerals refer to the same or similar elements. System 700 comprises a client device (C) 102 and a server (S) 104 and, in particular embodiments, comprises a bootstrap server (B) 106. Client device 102 may communicate with server 104 and bootstrap server 106 using any suitable communication protocol(s). Likewise, server 104 may communicate with bootstrap server 106 using any suitable communication protocol(s).

Client device 102 may be provisioned with particular credentials (such as cryptographic keys and digital certificates), as part of a factory bootstrap process (e.g. during manufacture). Without these credentials, client device 102 cannot establish trust with other machines in system 700. In this example, client device 102 is provisioned with a digital certificate for the client device 102 (which comprises information about the client device's public key), also referred to herein as Cert(C), and a private key of a public-private key pair, also referred to herein as Priv(C). Client device 102 may also be provisioned with information that enables the client device 102 to locate and connect to the bootstrap server 106 the first time the client device 102 is turned on post-manufacture. For example, the client device 102 may be provisioned with an IP address and a server name indication (SNI) of bootstrap server 106, to enable the client device 102 to search for the bootstrap server 106 and connect to it when first powered-up. This information may be provisioned on client device 102 as part of a factory bootstrap, or as part of a configuration or registration process by an owner of client device 102. In embodiments, the client device 102 may be pre-provisioned with all the information it requires to locate and communicate with server 104 in addition to, or instead of, being pre-provisioned with the information required to locate bootstrap server 106.

When client device 102 is powered-up in system 700, it may use the IP address and SNI of bootstrap server 106 to locate bootstrap server 106. The bootstrap server 106 comprises its own digital certificate (also referred to herein as Cert(B)). The bootstrap server 106 and client device 102 perform a TLS/DTLS handshake process to authenticate (step S702), and so that bootstrap server 106 can verify that client device 102 is permitted to join the system/network 700. The handshake process performed between the bootstrap server 106 and client device 102 involves the client device 102 providing Cert(C) to the bootstrap server 106 so that the bootstrap server can authenticate the client device 102, and involves the bootstrap server 106 providing Cert(B) to the client device 102. Once each machine has authenticated the other in this handshake process, the bootstrap server 106 may provide additional credentials (e.g. cryptographic keys and digital certificates) to client device 102 that may enable the client device 102 to communicate securely with server 104. For example, as shown in step S704, bootstrap server 106 may provide client device 102 with a private key (of a public-private key pair) for communication between the client device 102 and server 104 (shown as Priv(C-S) in FIG. 7), a digital certificate for the client device 102 and server 104 (shown as Cert(C-S) in FIG. 7), and a digital certificate of the server 104 (shown as Cert(S) in FIG. 7). The provisioning process of step S704 is described in more detail with reference to FIG. 2. The credentials are provided to client device 102 in a secure manner, i.e. in an encrypted format. The client device 102 may store these credentials in storage 102c alongside the manufacturer-provided credentials.

Client device 102 may need to communicate with server 104 to, for example, provide sensed/measured data to the server 104, to access services/applications via the server 104, to receive updates, instructions/commands, or data from server 104, etc. Typically, client devices and servers establish a secure communication session by performing a TLS/DTLS handshake process to authenticate each other before exchanging messages (i.e. encrypted messages). As in step S702, the TLS/DTLS handshake process between the server 104 and client device 102 requires the exchange of digital certificates so that each machine can authenticate/validate the other. The TLS/DTLS handshake process may require the exchange of a list of cryptographic algorithms/cipher suites, so that the machines may choose an algorithm for use in their communications. However, as mentioned earlier, a single digital certificate may be large, e.g. a single RSA-based certificate containing a 2048-bit key may be at least 1024 bytes in size. Similarly, if a client device supports multiple algorithms, then it needs to send a list of all supported algorithms/algorithm combinations to the server. Each algorithm may be encoded in the list as a 2 byte value, so a list of, for example, 20 algorithms (which is a typical number of algorithms supported by a client device), is 40 bytes in size. While much smaller than the size of a digital certificate, the list contributes to the overall amount of data that needs to be exchanged between servers and client devices. Accordingly, each time servers and client devices wish to establish a secure communication session, they have to exchange large amounts of data. In scenarios where communication occurs frequently (e.g. every few minutes, every hour, etc.), performing a TLS/DTLS handshake process can place strain on the resources of a constrained resource device (such as an IoT device). In the present techniques, the TLS/DTLS handshake process is optimised for any low-power wireless wide area network (LPWAN) where data transfer rates are low and machines have low-bandwidth connectivity. The present techniques may be suitable for any communication process where it may be expensive and/or power-inefficient to send and receive large quantities of data, e.g. the short messaging service (SMS) communication protocol.

As shown in FIG. 7, at step S706, instead of exchanging various digital certificates as per conventional TLS/DTLS handshake processes, the client device 102 transmits a uniform resource identifier (URI) or uniform resource locator (URL) for Cert(C-S) to server 104, and the server 104 transmits a fingerprint of Cert(S) to client device 102. The URI/URL for Cert(C-S) tells the server 104 where Cert(C-S) can be found, and thereby avoids the need to send the full client-server digital certificate during the handshake process. For example, the URI may point to the bootstrap server 106, such that the server 104 retrieves the digital certificate from bootstrap server 106 (step S708). This avoids the need for the client device 102 to send a large amount of data during the handshake—instead the server 104 can obtain the digital certificate from bootstrap server 106, neither of which are constrained devices. Similarly, the fingerprint of Cert(S) is a short sequence of bytes that may be used to identify Cert(S), such that Cert(S) does not need to be sent to the client device 102 during the handshake process, and client device 102 does not need to receive and process a large amount of data. This enables the amount of data exchanged as part of the handshake process to be reduced. For example, as mentioned above, a single RSA certificate may be 1024 bytes in size. A SHA-1 based fingerprint of Cert(S) may be 160 bits (i.e. 20 bytes) in size. A SHA-2 based fingerprint of Cert(S) may be 224/256/384/512 bits, preferably 256 bits (i.e. 32 bytes). A URI may be short, e.g. 17 bytes in size. Accordingly, the size of a fingerprint and of a URI is considerably smaller than that of a digital certificate.

In embodiments, the server 104 may transmit a URI/URL for Cert(S) to client device 102, instead of a fingerprint of Cert(S). However, this may only be possible in scenarios where client device 102 is well-connected/has good connectivity with other machines/devices/the Internet, so that it may use the URI to obtain the certificate, and/or has the resources (e.g. power) required to use the URI to obtain the certificate.

In embodiments, the server 104 and client device 102 may not need to exchange a list of supported algorithms/cipher suites, and make a selection from this list. As explained earlier, in a typical TLS/DTLS handshake process, a client device may send a list of cipher suites that it supports, potentially in order of preference, to a server. (Alternatively, the server may sent this list to the client device). The server selects a cipher suite from the list and informs the client device of this selection. The list of cipher suites may be large, which increases the amount of information sent between machines during a TLS/DTLS handshake. Machines may support twenty algorithms (or more) and if, for example, each algorithm is encoded by a 2 byte value in the list, the list could be 40 bytes in size. In embodiments, if the client device 102 knows which algorithm the server 104 prefers, the client device 102 may not need to send a list of supported algorithms to the server 104 to choose from. The client device 102 may be provisioned with algorithm preferences during a credential provisioning process (which may be during a factory bootstrapping process or via bootstrap server 106). Accordingly, the client device 102 may simply send a message to the server 104 which includes data indicating an algorithm that will be used in subsequent communications. (The algorithm may be one which the client device 102 knows the server 104 supports and/or prefers, and which the client device 102 itself supports and/or prefers). Thus, the data sent by client device 102 may be reduced from 40 bytes to 2 bytes, and the amount of processing to be performed by server 104 may also be reduced (as the server 104 no longer needs to select an algorithm from a list). It will be understood that the same reduction in data may also be achieved if the server 104 sends the client device 102 a list of algorithms. In this case, the server 104 may know, e.g. from the bootstrap server 106 or elsewhere, which algorithms the client device 102 supports and prefers.

It will be understood that the amount of other information transmitted between machines during a typical TLS/DTLS handshake may be reduced in a similar manner, by provisioning the client device 102 and/or server 104 with the information during a separate process (e.g. a bootstrapping process).

The server 104 and client device 102 use, respectively, the URI for Cert(C-S) and the fingerprint of Cert(S), for the authentication/validation process. This is described in more detail with respect to FIGS. 3 to 6. Once the handshake process has been successfully completed, the secure communication session is established and client device 102 and server 104 may exchange encrypted messages/data. (E.g. client device 102 may send an encrypted message requesting information from server 104 (step S712), and server 104 may send an encrypted message in response (step S714). It will be understood that the server 104 may request information from client device 102, and that the illustrated communication flow of steps S712 and S714 in FIG. 7 is merely exemplary and non-limiting).

Figure 8:
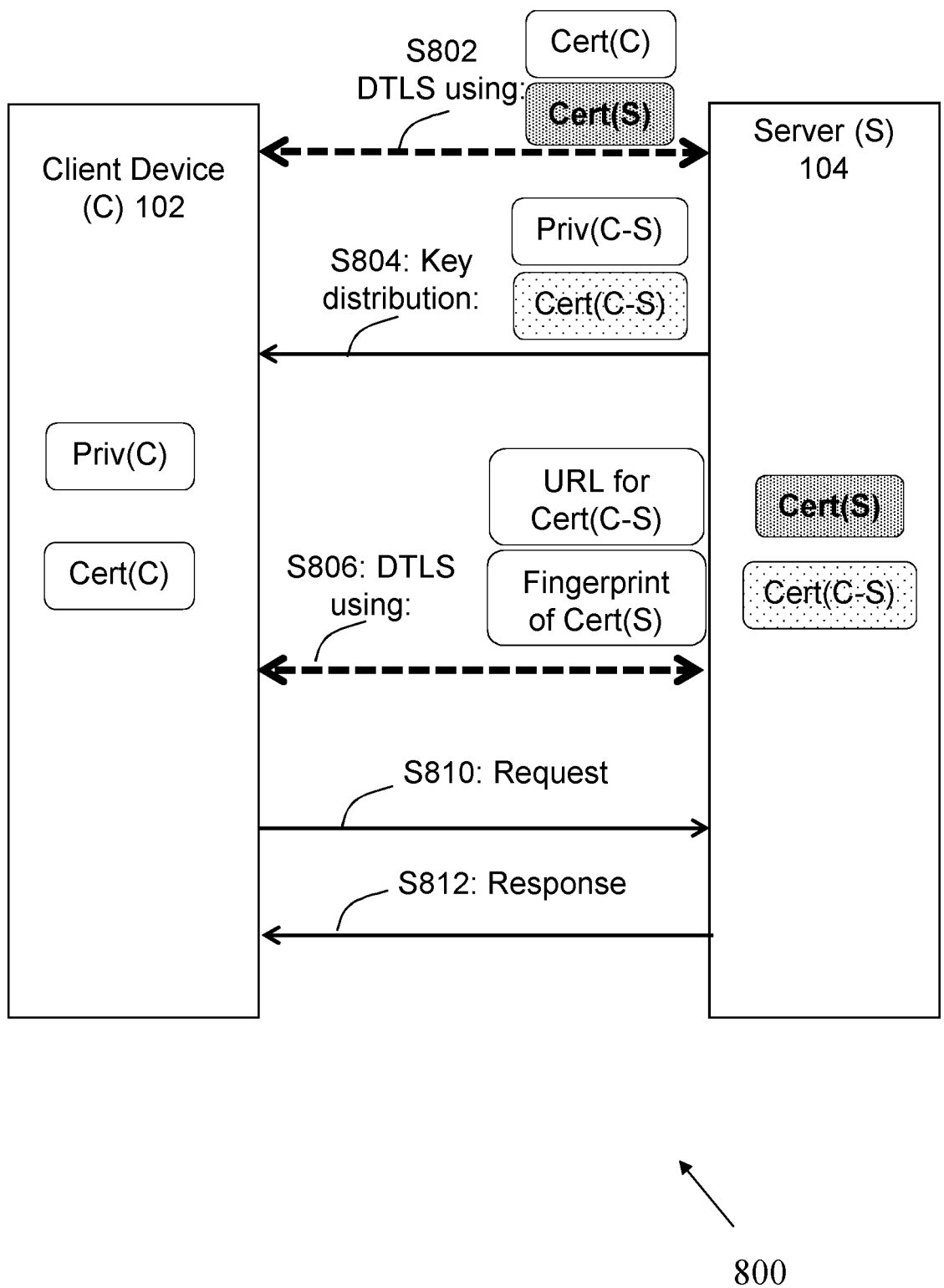
FIG. 8 is a block diagram of the system of FIG. 1 showing alternative example steps to perform an improved handshake between client device and server.

FIG. 8 shows an embodiment in which client device 102 is provisioned with particular credentials (such as cryptographic keys and digital certificates) when the client device 102 communicates with a server (e.g. server 104) for the first time. That is, a separate server (e.g. a bootstrap server or other server) may not be required to provision the client device 102 with any missing credentials, or in any subsequent communications between client device 102 and server 104.

In FIG. 8, client device 102 may be provisioned with Cert(C) and Priv(C) during manufacture. Client device 102 may also be provisioned with information that enables the client device 102 to locate and connect to the server 104 the first time the client device 102 is turned on post-manufacture (in addition to, or instead of, any information that enables the client device 102 to locate and connect to a bootstrap server). For example, the client device 102 may be provisioned with an IP address and a server name indication (SNI) of server 104, to enable the client device 102 to search for the server 104 and connect to it when first powered-up. This information may be provisioned on client device 102 as part of a factory bootstrap, or as part of a configuration or registration process by an owner of client device 102. The client device 102 may be provisioned with, during manufacture, the IP address and SNI of each server the client device is to communication with when installed in a system/network.

When client device 102 is powered-up in system 800, it may use the IP address and SNI of server 104 to locate server 104. The server 104 comprises its own digital certificate (also referred to herein as Cert(S)). The server 104 and client device 102 may perform a TLS/DTLS handshake process in order to authenticate each other (step S802). The handshake process performed between the server 104 and client device 102 involves the client device 102 providing Cert(C) to the server 104 so that the server can authenticate the client device 102, and involves the server 104 providing Cert(S) to the client device 102. Once each machine has authenticated the other in this handshake process, the server 104 is able to provide any additional credentials (e.g. cryptographic keys and digital certificates) to client device 102 that may enable the client device 102 to communicate securely with server 104 (step S804). For example, server 104 may provide client device 102 with a private key, Priv(C-S), of a public-private key pair for subsequent communications between the client device 102 and server 104, and a digital certificate, Cert(C-S), for the client device 102 and server 104. In this embodiment, server 104 may have created, or obtained, Cert(C-S) itself, and may store a copy of the digital certificate Cert (C-S).

The credentials are provided to client device 102 in a secure manner, i.e. in an encrypted format. The client device 102 may store these credentials in storage 102c alongside the manufacturer-provided credentials. Thus, in this embodiment, the server 104 provisions client device 102 with any missing credentials required for perform secure communications between the machines. For further security, the server 104 may provide the credentials to client device 102 using a different communication channel/communication protocol to that which is used to perform subsequent secure communications. For example, server 104 may transmit the credentials to client device 102 via a wireless mobile (cellular) telecommunication protocol, while all subsequent secure communications between client device 102 and server 104 are performed using a wireless communication protocol (e.g. WiFi).

Following the provisioning, client device 102 and server 104 may communicate as described above with respect to FIG. 7. That is, steps S806 to S812 are similar to steps S706 to S712. For example, at step S806, instead of exchanging various digital certificates as per conventional TLS/DTLS handshake processes, the client device 102 may transmit a uniform resource identifier (URI) or uniform resource locator (URL) for Cert(C-S) to server 104, and the server 104 may transmit a fingerprint of Cert(S) to client device 102. In this embodiment, however, the URL for Cert(C-S) may not point to a separate device/machine/server. In the embodiment of FIG. 7, Cert(C-S) was stored, or generated when required, by bootstrap server 106, and therefore, the URL for Cert(C-S) pointed to bootstrap server 106. In FIG. 8, Cert (C-S) may be stored within server 104, such that the URL points to the server itself. Alternatively, Cert(C-S) may still be located externally to server 104, e.g. in a bootstrap server or other remote machine. In this case, server 104 may have retrieved a copy of Cert(C-S) from the remote machine/bootstrap server during the client device 102 provision process of step S804. The server 104 may retrieve Cert(C-S) using the URL provided by client device 102 from this same remote machine/bootstrap server at step S806.

Thus, in embodiments there is provided a method of establishing a secure communication session between a client device and a server, the method comprising:

receiving, from a server, a request for a first digital certificate for authenticating the client device to the server, the first digital certificate comprising a client device identifier, a server identifier and a further identifier identifying a relationship between the client device and the server; transmitting, responsive to the request, a uniform resource identifier (URI) for the first digital certificate. The first digital certificate may be Cert(C-S).

In embodiments, there is provided a method of establishing a secure communication session between a client device and a server, the method comprising: transmitting, to a client device, a request for a first digital certificate for authenticating the client device, the first digital certificate comprising a client device identifier, a server identifier and a further identifier identifying a relationship between the client device and the server; receiving, from the client device, a client device identifier and a uniform resource identifier (URI) for the first digital certificate. The first digital certificate may be Cert(C-S).

Figure 2:
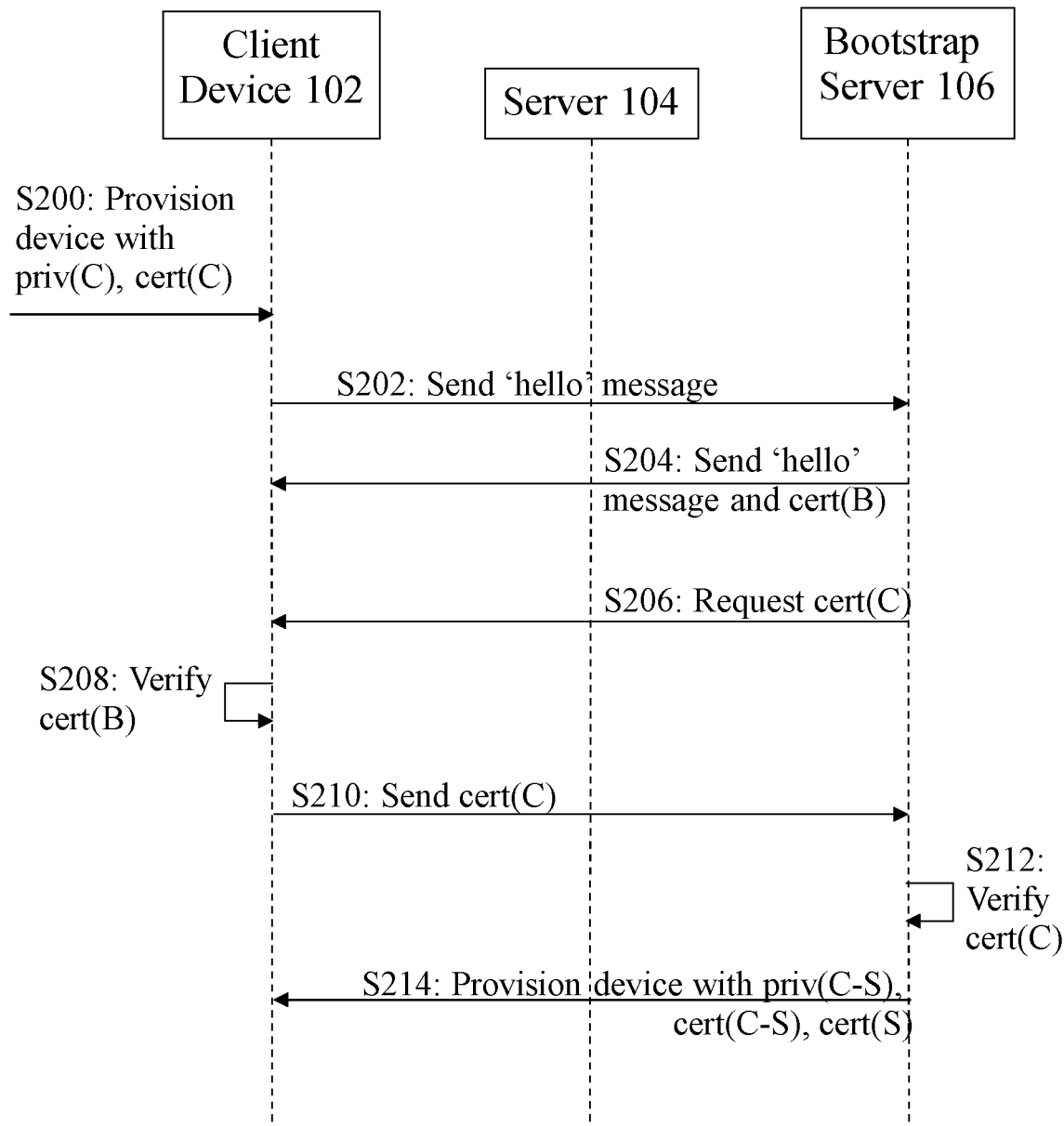
FIG. 2 shows a schematic diagram of steps to provision a client device with cryptographic keys and certificates to enable secure communication between the client device and a server.

FIG. 2 shows a schematic diagram of example steps to provision a client device (e.g. client device 102) with credentials to enable secure communication to be established between the client device 102 and a server (e.g. server 104). As mentioned above, the credentials may be provided to the client device 102 in any suitable manner, such that one or more credentials may be provided during a factory bootstrapping process, and/or one or more credentials may be provided via a bootstrap server, and/or one or more credentials may be provided upon connection to a server (e.g. server 104). FIG. 2 shows one particular embodiment in which the client device 102 is partly provisioned with credentials during a factory bootstrap process, and partly provisioned with credentials upon connection to a bootstrap server, but this is merely one example of how the provisioning may occur.

The credentials may be cryptographic keys and/or digital certificates. As mentioned earlier, client device 102 is provisioned with particular credentials (such as cryptographic keys and digital certificates), as part of a factory bootstrap process (step S200). Without these credentials, client device 102 cannot establish trust with other machines in the system/network in which the client device 102 is installed. In this example, client device 102 is provisioned with a digital certificate for the client device 102 (which comprises information about the client device's public key), also referred to herein as Cert(C), and a private key of a public-private key pair, also referred to herein as Priv(C). Client device 102 may also be provisioned with information that enables the client device 102 to locate and connect to the bootstrap server 106 the first time the client device 102 is turned on in the system/network in which the device is installed. For example, the client device 102 may be provisioned with an IP address and a server name indication (SNI) of bootstrap server 106, to enable the client device 102 to search for the bootstrap server 106 and connect to it when first powered-up. This information may be provisioned on client device 102 as part of a factory bootstrap, or as part of a configuration or registration process by an owner of client device 102.

Thus, at step S202, client device 102 uses the IP address and SNI of bootstrap server 106 to locate bootstrap server 106. Steps S202 to S212 are part of a TLS/DTLS handshake process. Steps S202 to S214 in FIG. 2 may only need to be performed once, i.e. the first time the client device powers-on when installed in a system/network. However, some or all of steps S202 to S214 may need to be repeated if, for example, the credentials provided to the client device 102 from bootstrap server 106 have an expiry date/lifetime, such that the client device 102 needs to obtain updated/new credentials.

In step S202, the client device may transmit a 'hello' message or similar to bootstrap server 106, which may include some information about the client device itself (as specified by the TLS/DTLS protocol). The bootstrap server 106 may reply with a 'hello' message and send the bootstrap digital certificate Cert(B) to client device 102 (step S204). The bootstrap server 106 may also request the client device digital certificate Cert(C) from client device 102 (step S206). The information sent/requested in steps S204 and S206 may be combined in a single step/message. At step S208, the client device 102 may use Cert(B) to verify the bootstrap server 106. If this verification process is successful, the client device 102 may sent Cert(C) to the bootstrap server 106. The client device 102 may also transmit a 'success' or 'authenticated' or 'finished' message to bootstrap server 106 indicating that the bootstrap server 106 has been authenticated/verified.

At step S212, the bootstrap server 106 may use Cert(C) to verify the client device 102. If this verification process is successful, the bootstrap server 106 may transmit a 'success' or 'authenticated' or 'finished' message to client device 102 indicating that the client device 102 has been authenticated/verified. Additionally or alternatively, the bootstrap server 106 may, in response to successful verification of the client device 102, simply provide the client device 102 with the credentials required to communicate with server 104 (and potentially any other machines/servers/devices in the same network/system). The bootstrap server 106 may be able to determine which credentials the client device 102 has and which credentials the client device 102 requires, and provide missing credentials accordingly. The bootstrap server 106 may comprise, for example, a database of all machines which are registered with the bootstrap server, together with information on the permissions/access any particular machine should have, and which credentials a machine has, and may require, to communicate with other machines. In this example, the bootstrap server 106 may determine that the client device 102 requires a private key (of a public-private key pair) for communication between the client device 102 and server 104, Priv(C-S), a digital certificate identifying a relationship between the client device 102 and server 104, Cert(C-S), and a digital certificate of the server 104, Cert(S), and may therefore transmit these credentials at step S214. Bootstrap server 106 may provide client device 102 with information about the algorithms/cipher suites supported by the server 104, and may indicate which of these algorithms are preferred. This may, as explained above, mean that the client device 102 and server 104 do not have to share lists of algorithms to select the algorithm for use in future communications, which may thereby reduce the amount of data transmitted during a TLS/DTLS handshake. The credentials are provided to client device 102 in a secure manner, e.g. encrypted using the cryptographic key pair associated with the client device 102 and bootstrap server 106. The client device 102 may store these newly-received credentials in storage 102c alongside the manufacturer-provided credentials, and may access them from storage 102c when a secure communication session with server 104 is to be established.

Figure 3:
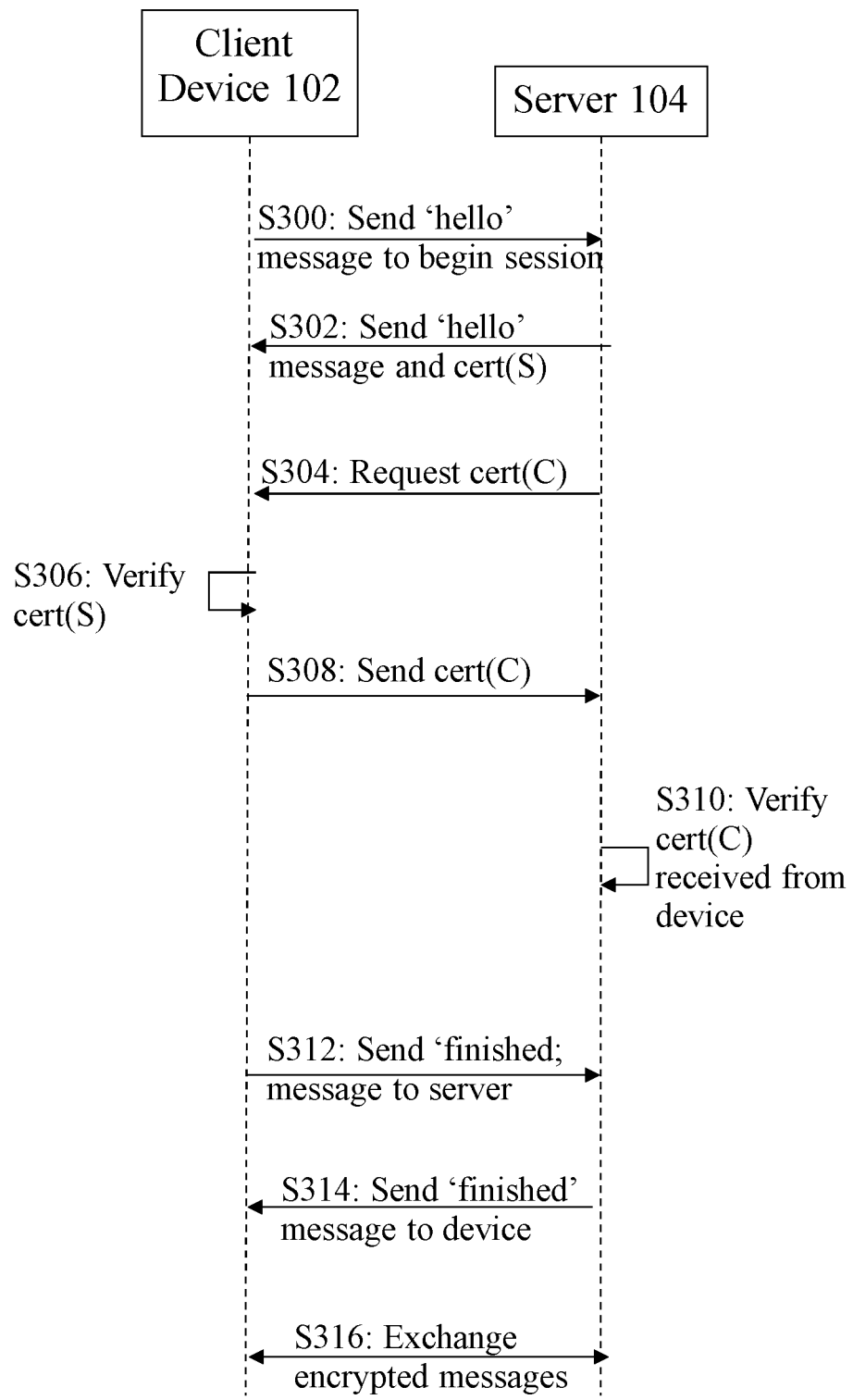
FIG. 3 shows a schematic diagram of steps to perform a handshake between a client device and a server.

FIG. 3 shows a schematic diagram of steps to perform a typical TLS/DTLS handshake between a client device and a server, to establish a secure communication session between the machines.

The process begins at step S300 when client device 102 transmits a 'client hello' message (or similar) to server 104. The client device 102 may have been provisioned with the SNI and IP address of the server 104 during a factory bootstrapping process, or by the bootstrap server 106. (It will be understood that the server 104 could equally initiate the handshake by sending the client device 102 the initial 'hello' message, and that the process in FIG. 3 is merely exemplary.) The 'client hello' message may comprise a random byte string that is used in subsequent computations in the handshake process.

At step S302, the server 104 responds by transmitting a 'server hello' message to client device 102. The 'server hello' message may comprise a further random byte string, and its own digital certificate, Cert(S). If the server 104 requires the client device's digital certificate to authenticate the client device 102, then the server 104 also transmits a message requesting Cert(C) (step S304). This request for Cert(C) may be included in the 'server hello' message at step S302.

At step S306, the client device 102 verifies Cert(S) received from server 104. If the verification is unsuccessful, the client device 102 may terminate the process, or send a 'fail' message to the server 104 before terminating the handshake process. If the verification is successful, the client device 102 transmits an encrypted random byte string to server 104 (not shown in FIG. 3). The random byte string is encrypted using the server's public key, and the encrypted random byte string enables both the client device and server to compute the secret key to be used for encrypting subsequent messages exchanged between the machines.

If the server 104 requested Cert(C), at step S308, the client device 102 transmits Cert(C) to server 104. The client device 102 may also transmit a random byte string encrypted with the client device's private key.

At step S310, the server 104 verifies Cert(C) received from client device 102. If the verification is unsuccessful, the server 104 may terminate the process, or send a 'fail' message to the client device 102 before terminating the handshake process.

At step S312, the client device 102 transmits a 'finished' message to server 104, which is encrypted with the secret key. This 'finished' message indicates that the client device 102 part of the handshake process is complete. Similarly, at step S314, the server 104 transmits a 'finished' message to client device 102, which is encrypted with the secret key. This 'finished' message indicates that the server 104 part of the handshake process is complete. The secure communication session has now been established, and the client device 102 and server 104 may exchange messages during the session which are encrypted with the shared secret key (step S316).

However, as shown in FIG. 3, this TLS/DTLS handshake process requires the client device 102 and server 104 to share their digital certificates (see step S302 and S308), and for each machine to verify the received digital certificates. This requires a considerable amount of data to be transmitted between the machines 102, 104 before they can even begin exchanging encrypted messages.

As explained earlier, the TLS/DTLS protocols may be used to secure the communication between an IoT device and a remote (e.g. cloud-based) server and/or service. During a TLS/DTLS handshake, the IoT device and the remote server exchange their digital certificates. These can be fairly large, particularly if they contain not just a single certificate but an entire chain of certificate, or if one or more certificates are RSA certificates. Some changes to the original TLS/DTLS protocol have already been proposed. For example, RFC 7924 proposes a modification to the TLS protocol to avoid transmission of server digital certificates. However, this modification still requires a full handshake to be executed. Similarly, RFC 6066 proposes a modification to the TLS protocol to avoid transmission of a client certificate, but here a URL pointing to the client certificate needs to be uploaded somewhere on the Internet, and must be known to and accessible by the client. These proposals have not therefore reduced the burden placed on constrained devices (such as IoT devices) during TLS/DTLS handshakes.

The lightweight machine to machine communication protocol (OMA LWM2M) has a component referred to as bootstrapping, which enables an IoT device to be provisioned with security parameters/credentials. For example, the LWM2M bootstrapping process may be used to provide an IoT device with Priv(C) (i.e. the private key of the IoT device), the IoT device digital certificate Cert(C), and an LWM2M server digital certificate Cert(S) associated with the LWM2M server with which the IoT device may communicate/interact with. The server certificate Cert(S) is used as a trust anchor, or a pinned certificate, so that an LWM2M client running on the IoT device is able to authenticate and authorise the LWM2M server as the legitimate server it needs to interact with. The LWM2M server on the other hand needs to be sure that it talks with the correct LWM2M client (and IoT device). Therefore, the IoT device uses its provisioned certificate Cert(C) to authenticate itself to the LWM2M server during the TLS handshake process. The LWM2M server obtains the certificate of the LWM2M client (IoT device) from a bootstrap server in an out-of-band exchange. Generally speaking, there is a trusted relationship between the entity running the bootstrap server and the entity that operates the LWM2M server.

According to the current description of the LWM2M version 1.0 specification, the handshake process requires both parties to exchange their digital certificates. While the use of elliptic curve cryptography is recommended for use in the IoT, many IoT devices use the RSA cryptographic algorithm due to the smaller key sizes involved and because there is a desire to re-use existing public key infrastructure components which tend to still rely on RSA keys. A single RSA-based digital certificate containing a 2048 bit key can easily be larger than 1024 bytes. In some cases a certificate chain needs to be communicated, instead of a single key, and therefore, a significant amount of data may need to be transmitted and received in the handshake process alone.

The present techniques reduce the amount of data which is transmitted between clients and servers during a handshake process, which may be suitable for use with elliptic curve cryptography and RSA cryptography, and even with large keys (e.g. 3072-bit RSA keys). The present techniques remove the need for performing a full TLS/DTLS handshake and instead aspects of the handshake are replaced by a bootstrapping process. This is now described in detail with respect to FIG. 4.

Figure 4:
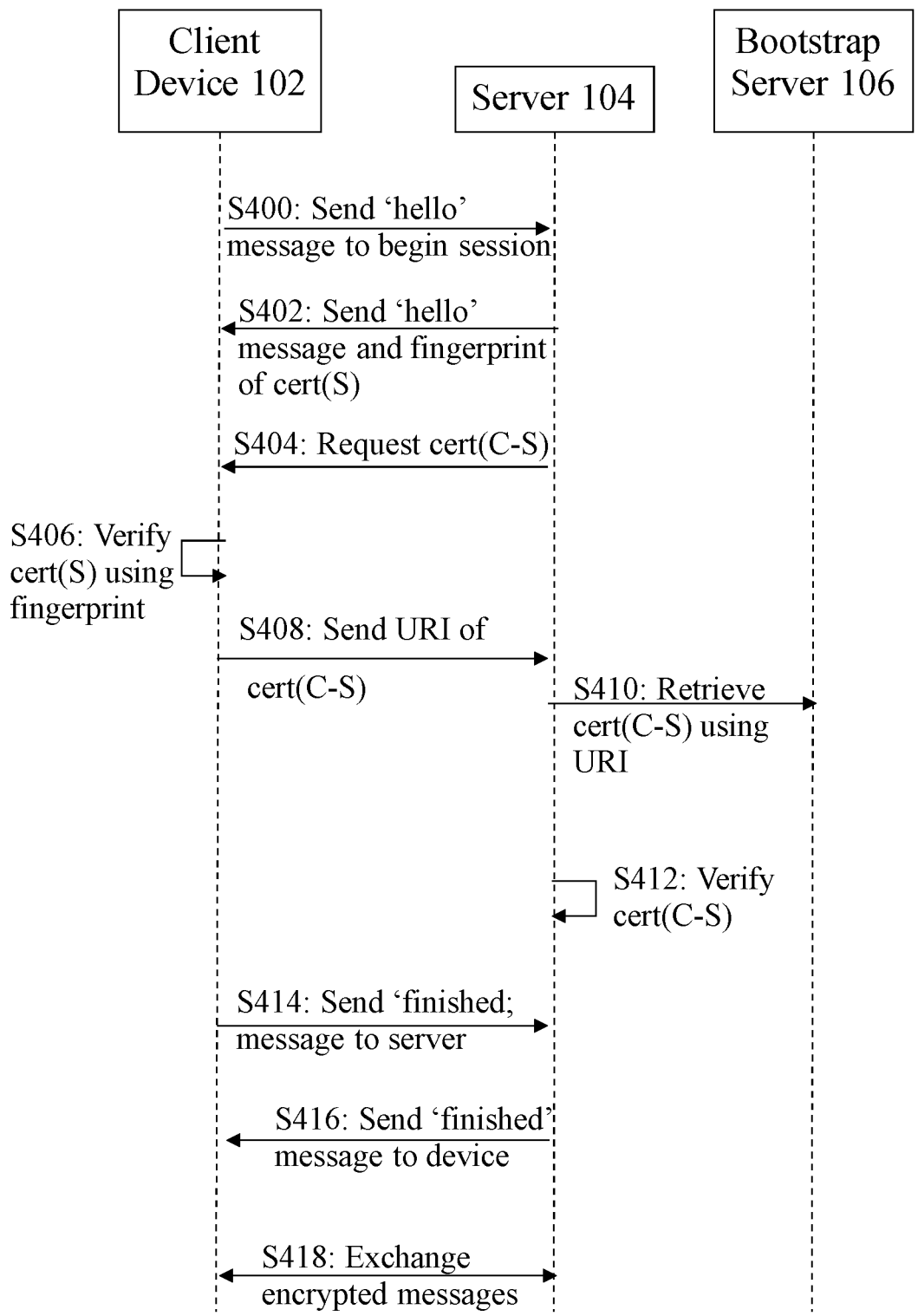
FIG. 4 shows a schematic diagram of steps to perform an improved handshake between a client device and a server.

FIG. 4 shows a schematic diagram of steps to perform an improved TLS/DTLS handshake between a client device 102 and a server 104, to establish a secure communication session between the machines. The improved process may be particularly suitable for low-bandwidth machines and networks, and for communicating with constrained devices.

The process begins at step S400 when client device 102 transmits a 'client hello' message (or similar) to server 104. The client device 102 may have been provisioned with the SNI and IP address of the server 104 during a factory bootstrapping process, or by the bootstrap server 106. (It will be understood that the server 104 could equally initiate the handshake by sending the client device 102 the initial 'hello' message, and that the process in FIG. 4 is merely exemplary and non-limiting) The 'client hello' message may comprise a random byte string that is used in subsequent computations in the handshake process.

In embodiments, the client device 102 may send a list of the algorithms/cipher suites supported by the client device 102 (possibly in order of preference) to the server 104. This list may be included within the initial 'client hello' message, or sent separately. The server 104 may select an algorithm from this list and inform the client device 102 of this selection, such that the selected algorithm is used/applied to subsequent communications. In alternative embodiments, if the client device 102 has already acquired information about the algorithms supported by the server 104 (perhaps with information on preferred algorithms), the client device 102 may not need to transmit this list to server 104. For example, as explained above, if the client device 102 knows which algorithm the server 104 prefers, the client device 102 may not need to send a list of supported algorithms to the server 104 to choose from. The client device 102 may be provisioned with algorithm preferences during a credential provisioning process (which may be during a factory bootstrapping process or via bootstrap server 106). Accordingly, the client device 102 may simply send a message to the server 104 which includes data indicating which algorithm that will be used in subsequent communications. (The algorithm may be one which the client device 102 knows the server 104 supports and/or prefers, and which the client device 102 itself supports and/or prefers). This information may be included within the initial 'client hello' message. Thus, the data sent by client device 102 for this part of the TLS/DTLS handshake may be reduced from, for example, 40 bytes to 2 bytes. (It will be understood that in embodiments, it is the server 104 that sends a list of supported and/or preferred algorithms to the client device 102. The same reduction in data may be achieved if the server 104 is already aware of the algorithms supported/preferred by client device 102).

At step S402, the server 104 responds by transmitting a 'server hello' message to client device 102. The 'server hello' message may comprise a further random byte string, and a fingerprint of the server's own digital certificate, Cert(S). The fingerprint, or fingerprint data, corresponding to the server's digital certificate may be, for example, a short sequence of bytes which may be used to identify Cert(S) itself, or may be a hashed version of Cert(S). The fingerprint data is created by applying a cryptographic hash function to Cert(S), or to some data that identifies or is associated with Cert(S). Thus, in contrast to step S302 in FIG. 3, in the improved handshake process, the server transmits fingerprint data associated with Cert(S) instead of transmitting the full digital certificate. As shown in FIG. 7, client device 102 is provisioned with a copy of Cert(S) from bootstrap server 106. Thus, client device 102 has a local copy of Cert(S). Client device 102 is also provided with information indicating which cryptographic hash function is being used by server 104 to create fingerprint data. This information is required so that the client device 102 can verify the fingerprint data, and thereby authenticate/verify the server 104.

In embodiments, the method may comprise receiving, from the client device, a request for a second digital certificate for authenticating the server to the client device, the second digital certificate comprising the server identifier; and transmitting, responsive to the request, fingerprint data corresponding to the second digital certificate.

The step of transmitting fingerprint data may comprise: retrieving, from storage, the second digital certificate; retrieving, from storage, a cryptographic hash function associated with the client; applying the cryptographic hash function to the second digital certificate to generate the fingerprint data.

The method may comprise determining, prior to transmitting the fingerprint data for the second digital certificate, the expiry date of the second digital certificate; wherein, when the second digital certificate is determined to have expired, the method comprises: generating an updated second digital certificate; and transmitting, to the client device, the updated second digital certificate instead of the fingerprint data. In embodiments, the method comprises transmitting, to a further server which provisions the client device with certificates, the updated second digital certificate. For example, if the client device is provisioned with credentials using a bootstrap server 106, then the updated second digital certificate may be transmitted to bootstrap server 106, and the bootstrap server may transmit the updated second digital certificate to the client device 102.

The cryptographic hash function may be any suitable cryptographic has function, such as one of: an MD5 hash function; any Secure Hash Algorithm (SHA) hash function; a SHA-2 hash function; a SHA-3 hash function; or a SHA-256 hash function.

Server 104 requires the client device 102 to provide information verifying the relationship between server 104 and client device 102. Thus, server 104 transmits a message requesting the client-server digital certificate Cert(C-S) (step S404). This request for Cert(C-S) may be included in the 'server hello' message at step S402.

At step S406, the client device 102 verifies Cert(S), and thereby authenticates server 104, using the fingerprint data received from server 104. The client device 102 retrieves Cert(S) and the cryptographic hash function associated with server 104 from storage 102c. As the client device 102 may communicate with multiple servers, the credentials and information stored in storage 102c may be indexed (e.g. using the SNI of each server) so that it is clear which credentials are associated with which server/machine. The client device 102 applies the cryptographic hash function associated with server 104 to Cert(S) associated with server 104, to generate fingerprint data. The client device may compare the generated fingerprint data with the fingerprint data received from server 104. If the generated fingerprint data is the same as the received fingerprint data, then the client device 102 verifies the server 104. In embodiments, the client device 102 may have saved generated fingerprint data for server 104 in storage 102c, such that the client device may simply retrieve the pre-generated fingerprint data to perform the verification. If the verification is unsuccessful, the client device 102 may terminate the process, or send a 'fail' message to the server 104 before terminating the handshake process. If the verification is successful, the client device 102 transmits an encrypted random byte string to server 104 (not shown in FIG. 4). The random byte string is encrypted using the server's public key, and the encrypted random byte string enables both the client device and server to compute the secret key to be used for encrypting subsequent messages exchanged between the machines.

In embodiments, the method may comprise requesting, from the server, a second digital certificate, the second digital certificate comprising the server identifier; receiving, responsive to the request, fingerprint data corresponding to the second digital certificate.

In embodiments, the method may comprise retrieving, from storage, a copy of the second digital certificate; generating, using the copy of the second digital certificate, fingerprint data corresponding to the second digital certificate; comparing the generated fingerprint data to the received fingerprint data; and authenticating the server if the generated fingerprint data matches the received fingerprint data. The step of generating fingerprint data may comprise: retrieving, from storage, a cryptographic hash function associated with the server; and applying the cryptographic hash function to the retrieved copy of the second digital certificate.

Additionally or alternatively, the method may comprise: retrieving, from storage, pre-generated fingerprint data corresponding to the second digital certificate; comparing the pre-generated fingerprint data to the received fingerprint data; and authenticating the server if the pre-generated fingerprint data matches the received fingerprint data. In this case, the pre-generated fingerprint data may be generated by: retrieving, from storage, a cryptographic hash function associated with the server; retrieving, from storage, a copy of the second digital certificate; applying the cryptographic hash function to the retrieved copy of the second digital certificate, to generate fingerprint data corresponding to the second digital certificate; and storing the generated fingerprint data as pre-generated fingerprint data.

The cryptographic hash function may be any one of: an MD5 hash function; any Secure Hash Algorithm (SHA) hash function; a SHA-2 hash function; a SHA-3 hash function; or a SHA-256 hash function.

In response to the server 104 request for Cert(C-S), at step S408, the client device 102 transmits a uniform resource identifier (URI) for Cert(C-S) to server 104. The client device 102 may also transmit a random byte string encrypted with the client device's private key. The URI for Cert(C-S) indicates where a copy of Cert(C-S) may be obtained, thus avoiding the need for client device 102 to transmit a copy of the digital certificate itself. Thus, in contrast to step S308 in FIG. 3, at step S408 of the improved handshake process, the client device 102 does not transmit the full digital certificate to server 104 but only sends a URI indicating from where Cert(C-S) may be retrieved.

In embodiments, the method of establishing a secure communication session between a client device and a server comprises: receiving, from a server, a request for a first digital certificate for authenticating the client device to the server, the first digital certificate comprising a client device identifier, a server identifier and a further identifier identifying a relationship between the client device and the server; transmitting, responsive to the request, a uniform resource identifier (URI) for the first digital certificate.

In embodiments, a further server (e.g. a bootstrap server) may provision the client device with the first digital certificate. The further server may provision the client device with information indicating at least one cryptographic algorithm or cipher suite supported by the server.

In embodiments, the method may comprise generating the URI for the first digital certificate, wherein the URI comprises: a domain name of a bootstrap server which provided the first digital certificate to the client device; the client device identifier; and the server identifier. In embodiments, the URI comprises: a domain name of a further server from which the first digital certificate is obtainable; the client device identifier; and the server identifier. The location which the URI points to may depend on how the client device is provisioned with the first digital certificate, i.e. Cert(C-S). For example, if the client device is provisioned with Cert(C-S) by bootstrap server 106 (which may be any server, and/or which may not solely perform bootstrapping or credential provisioning), then the URI may point to bootstrap server 106. If the client device is provisioned with Cert(C-S) from server 104, the URI may point to server 104, or may point to the device/machine which provided server 104 with Cert(C-S). Thus, in some embodiments, the further server may be the machine which provisioned the client device (directly or indirectly) with the first digital certificate.

In embodiments, the method may comprise: determining, prior to transmitting the URI for the first digital certificate, the expiry date of the first digital certificate; wherein, when the first digital certificate is determined to have expired, the method comprises: requesting an updated first digital certificate; and transmitting, to the server, the updated first digital certificate instead of a URI. In embodiments, the step of requesting an updated first digital certificate comprises sending a request to a further server which provisioned the client device with the first digital certificate.

The client device 102 may generate a URI for each Cert(C-S), i.e. for each server with which it has a relationship. In embodiments, the client device may use the URI format defined in RFC 6066. In any case, the client device 102 may be provided with a default URI construction. In this embodiment, the Cert(C-S) is located either in the bootstrap server 106, or in a secure server (e.g. a HTTPS server) associated with/coupled to bootstrap server 106, and is indexed with the name (e.g. SNI) of server 104 and a URI of the client device 102. For example, the template URI may be:

https://www.example.com/cert{?ep,sni} where:

"www.example.com" corresponds to the fully qualified domain name (FQDN) of the bootstrap server 106 that provided the client device 102 with information about the server certificate Cert(S);

"ep" is a unique endpoint name identifier of the client device 102, as for example used in the LWM2M protocol; and "sni" is the server name indication that is used to refer to the server 104 that the client device 102 seeks to communicate with. The SNI parameter corresponds to the identity information found in the certificate identifying server 104.

It is insufficient for the URI to only identify the client device 102, and not the server 104, or for the server 104 to authenticate the client device 102 using its digital certificate Cert(C) alone. This is because client devices 102 may be configured to communicate with multiple servers, and may therefore be provisioned with different digital certificates for use with each server to improve privacy protection (unlinkability). Thus, server 104 requires Cert(C-S) to authenticate client device 102 (which identifies a server, a client and the relationship between them), rather than just Cert(C).

Using the template URI above, the client device 102 may generate a URI for a specific server 104 as follows. If, for example, the bootstrap server 106 is located at a URI bootstrap.example.net, and if the endpoint name is "0c727e90-b30411e6", and if the SNI is "server.org", then the resulting URI is https://bootstrap.example.net/cert?ep=0c727e90-b30411e6&sni=server.org At step S410, the server 104 uses the URI to obtain a copy of Cert(C-S). In embodiments, Cert(C-S) may be stored in (or generatable when required by) the bootstrap server 106, and therefore, the URI points to a location in the bootstrap server 106. The server 104 may therefore obtain Cert(C-S) from bootstrap server 106. At step S412, the server 104 verifies Cert(C-S) as obtained via the URI received from client device 102. As Cert(C-S) may comprise information identifying the server and client, the server 104 may determine if the identity of the server in Cert(C-S) matches the identity of server 104, and if the identify of the client in Cert(C-S) matches the identity of client device 102. Other techniques may be used to verify Cert(C-S) and thereby authenticate client device 102. If the verification is unsuccessful, the server 104 may terminate the process, or send a 'fail' message to the client device 102 before terminating the handshake process.

Thus, in embodiments, a method of establishing a secure communication session between a client device and a server may comprise: transmitting, to a client device, a request for a first digital certificate for authenticating the client device, the first digital certificate comprising a client device identifier, a server identifier and a further identifier identifying a relationship between the client device and the server; receiving, from the client device, a client device identifier and a uniform resource identifier (URI) for the first digital certificate.

In embodiments, the method may comprise: retrieving, using the URI, the first digital certificate; comparing the client device identifier in the retrieved first digital certificate with the received client device identifier; comparing the server identifier of the retrieved first digital certificate with a stored server identifier; authenticating the client device if the client device identifier of the first digital certificate matches the received client device identifier, and if the server identifier of the first digital certificate matches the stored server identifier.

At step S414, the client device 102 transmits a 'finished' message to server 104, which is encrypted with the secret key. This 'finished' message indicates that the client device 102 part of the handshake process is complete. Similarly, at step S416, the server 104 transmits a 'finished' message to client device 102, which is encrypted with the secret key. This 'finished' message indicates that the server 104 part of the handshake process is complete. The secure communication session has now been established, and the client device 102 and server 104 may exchange messages during the session which are encrypted with the shared secret key (step S418).

The method may comprise transmitting, to the server, a message indicating the server has been authenticated. The method may comprise receiving, from the server, a message indicating the server has authenticated the client device.

In embodiments, when the secure communication session is established, the method may further comprise exchanging encrypted messages with the server. The established secure communication session may terminated when the exchanging of encrypted messages is completed, and/or after a specified time period has lapsed.

The method may comprise transmitting, to the client device, a message indicating the client device has been authenticated. The method may comprise receiving, from the client device, a message indicating the server has been authenticated by the client device.

In embodiments, when the secure communication session is established, the method may comprise exchanging encrypted messages with the client device. The established secure communication session may be terminated when the exchanging of encrypted messages is completed, and/or after a specified time period has lapsed.

The first digital certificate and/or second digital certificate may be a certificate chain.

In embodiments, establishing a secure communication session between the client device and the server may comprise using a (modified) TLS/DTLS handshake sequence.

In embodiments, the client device and the server may communicate using any one of: a LWM2M protocol, an OMA lightweight machine-to-machine (OMA LWM2M) protocol; an OMA DM specification, an Open Interconnect Consortium (OIC) protocol, or a TR-069 protocol.

The client device may be an Internet of Things (IoT) device.

The server may be any one of: a LWM2M server, an OMA LWM2M server, a bootstrap server, an LWM2M bootstrap server, a TR-069 server, an OIC server, or an OMA DM server.

Thus, as shown in FIG. 4, the improved TLS/DTLS handshake process may remove the need for the client device 102 and server 104 to transmit their digital certificates to each other. This therefore reduces the amount of data to be transmitted between the machines 102, 104 before they can even begin exchanging encrypted messages.

Figure 5:
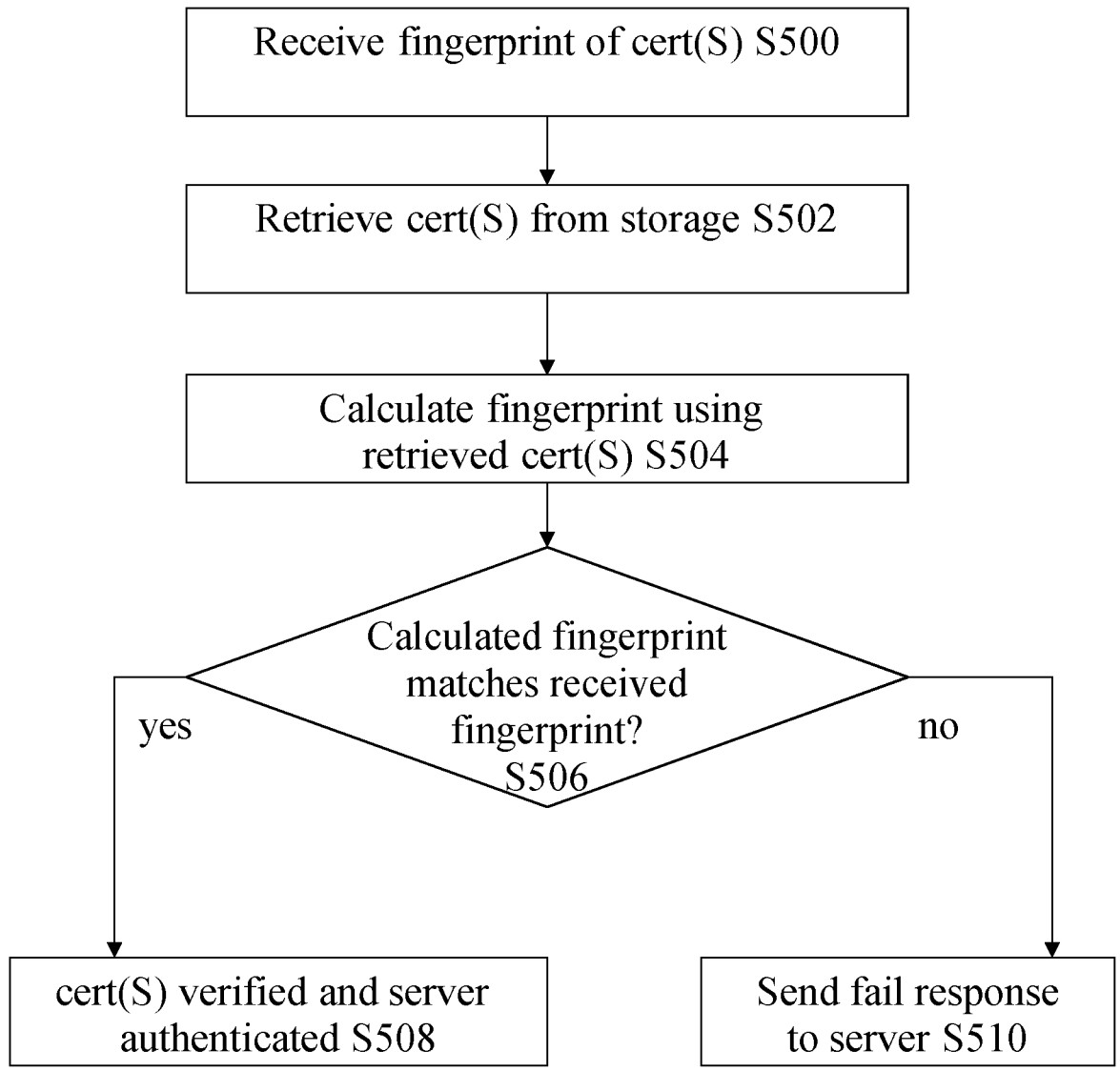
FIG. 5 shows a flow diagram of example steps performed by a client device as part of the improved handshake process of FIG. 4.

FIG. 5 shows a flow diagram of example steps performed by a client device as part of the improved handshake process of FIG. 4. As shown in FIG. 4, at step S406 the client device 102 verifies Cert(S), and thereby authenticates server 104, using the fingerprint data received from server 104. This verification process is shown in more detail in FIG. 5.

At step S500, the client device receives, from server 104, fingerprint data associated with the server digital certificate Cert(S). At step S502, the client device 102 retrieves Cert(S) and the cryptographic hash function associated with server 104 from storage 102c. As the client device 102 may communicate with multiple servers, the credentials and information stored in storage 102c may be indexed (e.g. using the SNI of each server) so that it is clear which credentials are associated with which server/machine.

At step S504, the client device 102 calculates the fingerprint or generates the fingerprint data itself using the retrieved Cert(S) and retrieved hash function. Specifically, the client device 102 may apply the cryptographic hash function associated with server 104, to the digital certificate Cert(S) associated with server 104, to generate fingerprint data. In embodiments, the client device 102 may have previously generated fingerprint data for server 104 and saved the generated fingerprint data in storage 102c, such that the client device may simply retrieve the pre-generated fingerprint data to perform the verification.

At step S506, the client device 102 may compare the generated fingerprint data with the fingerprint data received from server 104 at step S500. If the generated fingerprint data is determined to match the received fingerprint data, then the client device 102 verifies Cert(S) and authenticates the server 104 (step S508). If the verification is unsuccessful, the client device 102 may terminate the process, or send a 'fail' message to the server 104 before terminating the handshake process (step S510). The handshake process then continues as described above with respect to FIG. 4.

Figure 6:
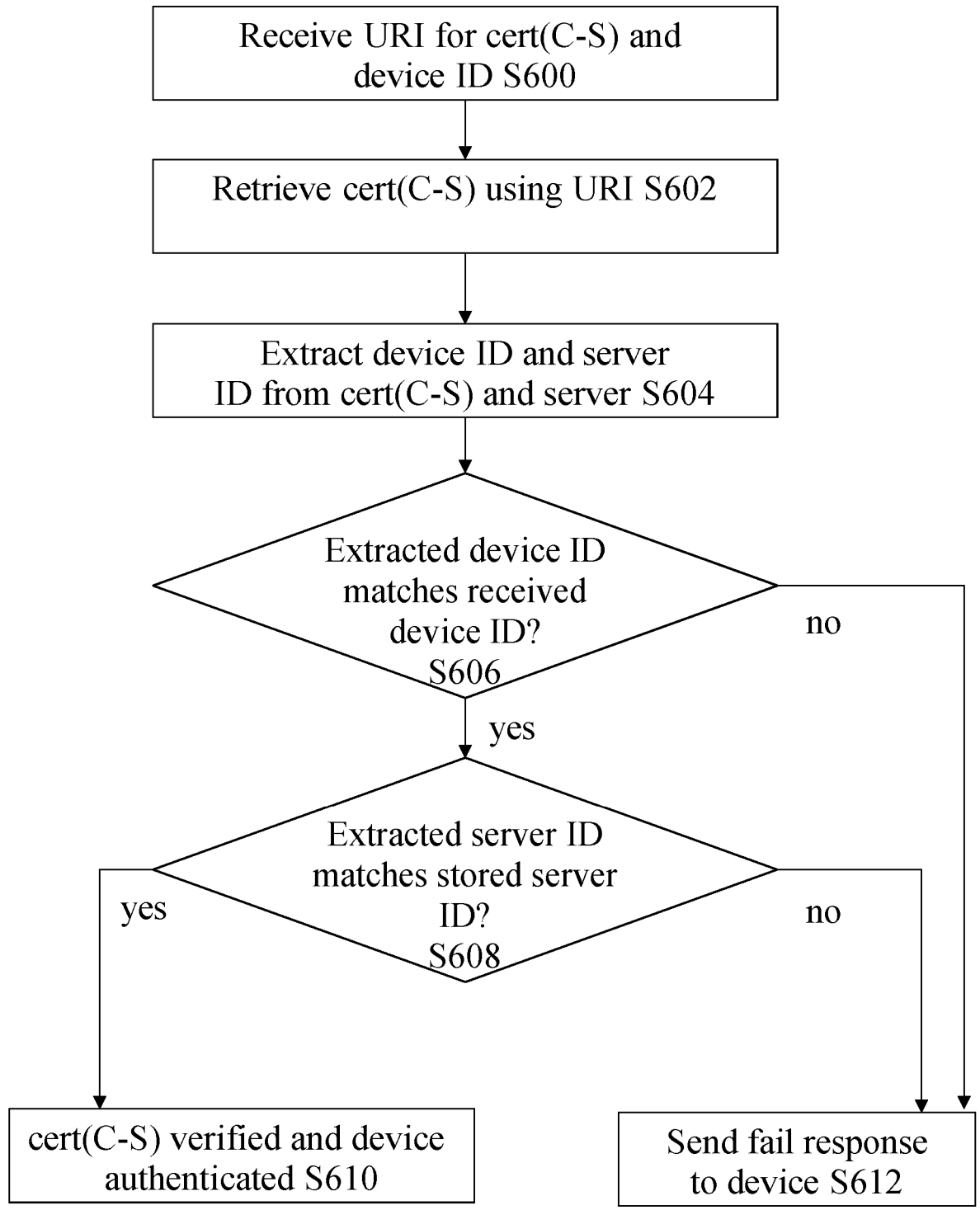
FIG. 6 shows a flow diagram of example steps performed by a server as part of the improved handshake process of FIG. 4.

FIG. 6 shows a flow diagram of example steps performed by a server as part of the improved handshake process of FIG. 4. As shown in FIG. 4, at steps S410 and S412, the server 104 authenticates the client device 102—this process is shown in more detail in FIG. 6.

The process begins at step S600, when the server receives a URI for Cert(C-S) from client device 102. Cert(C-S) identifies a relationship between a client and a server and therefore, the server 104 needs to determine that it is the server identified in the certificate, and the client device 102 is the client identified in the certificate.

At step S602, the server 104 uses the URI to obtain Cert(C-S). In embodiments, Cert(C-S) may be stored in the bootstrap server 106, or may be generatable on-the-fly when required by the bootstrap server 106. Thus, the URI may point to a location in the bootstrap server 106. The server 104 may therefore obtain Cert(C-S) from bootstrap server 106.

At step S604, the server 104 verifies Cert(C-S) as obtained via the URI. As Cert(C-S) comprises information identifying the server and client for which the certificate is created, the server 104 may extract the identity information from Cert(C-S). At step S606, the server 104 may determine if the extracted identity of the client in Cert(C-S) matches the identity of client device 102. If yes, the process proceeds to step S608. If not, the process terminates and a 'fail' response may be sent to the client device (step S612). At step S608, the server may determine if the extracted identity of the server in Cert(C-S) matches the identity of server 104. If yes, Cert(C-S) is verified and client device 102 is authenticated (step S610). If the verification is unsuccessful, the server 104 may terminate the process, or send a 'fail' message to the client device 102 before terminating the handshake process (step S612). It will be understood that the order of steps S606 and S608 may be switched.

Embodiments of the present techniques propose modifications to the LWM2M specification such that the reduced-bandwidth handshake process described herein can be used with LWM2M. Specifically, the present techniques propose extending the LWM2M security object to convey a full certificate chain (rather than a single certificate only). The currently specified resource "Server Public Key" needs to be extended to support multiple instances (instead of a single instance only). Furthermore, the present techniques propose adding a new resource to convey the certificate URI to be added to the LWM2M security object.

Embodiments of the present techniques also provide a non-transitory data carrier carrying code which, when implemented on a processor, causes the processor to carry out the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. A method of establishing a secure communication session between a client device and a first server, the method performed by the client device comprising:
sending to the first server or receiving from the first server a communication to initiate a handshake process to establish the secure communication session and performing the handshake process with the first server, the handshake process comprising:
receiving, at the client device, a request from the first server for a first digital certificate to authenticate the client device, wherein the client device comprises information provisioned by a second server indicating at least one cryptographic algorithm or cipher suite supported by the first server;
generating a uniform resource identifier (URI) for the requested first digital certificate, wherein the URI comprises:
a domain name of the second server from which the first digital certificate is obtainable;
a client device identifier; and
a server identifier for the first server;
transmitting, to the first server, the URI to enable the first server to obtain the requested first digital certificate from the second server;
receiving, from the first server, a further URI identifying a domain name of a resource from which a second digital certificate to enable the client device to authenticate the first server is obtainable, wherein the resource is remote from the client device;
in response to receiving the further URI that identifies the domain name of the resource remote form the client device, retrieving the second digital certificate from the resource that enables the client device to authenticate the first server;
authenticating the first server using the second digital certificate;
completing the handshake process to establish the communication session after the first server and the client device are is authenticated; and
receiving, from the first server, one or more communications during the communication session.

2. The method as claimed in claim 1, further comprising:
determining, prior to transmitting the URI for the first digital certificate, an expiry date of the first digital certificate;
wherein, when the first digital certificate is determined to have expired, the method comprises:
requesting an updated first digital certificate; and
transmitting, to the first server, that requested the first digital certificate, the updated first digital certificate instead of a URI.

3. The method as claimed in claim 2, wherein step of requesting the updated first digital certificate comprises:
sending a request to the second server, which provisioned the client device with the first digital certificate.

4. The method as claimed in claim 1, further comprising:
requesting, from the first server, that requested the first digital certificate, a third digital certificate, the third digital certificate comprising the server identifier; and
receiving, responsive to the request, fingerprint data corresponding to the third digital certificate.

5. The method as claimed in claim 4, further comprising:
retrieving, from storage, a copy of the third digital certificate;
generating, using the copy of the third digital certificate, fingerprint data corresponding to the third digital certificate;
comparing the generated fingerprint data to the received fingerprint data; and
authenticating the first server, that requested the first digital certificate, if the generated fingerprint data matches the received fingerprint data.

6. The method as claimed in claim 5, wherein the step of generating the fingerprint data comprises:
retrieving, from the storage, a cryptographic hash function associated with the first server; and
applying the cryptographic hash function to the retrieved copy of the third digital certificate.

7. The method as claimed in claim 5, further comprising:
transmitting, to the first server, that requested the first digital certificate, a message indicating that the first server has been authenticated.

8. The method as claimed in claim 4, further comprising:
retrieving, from storage, pre-generated fingerprint data corresponding to the third digital certificate;
comparing the pre-generated fingerprint data to the received fingerprint data; and
authenticating the first server, that requested the first digital certificate, if the pre-generated fingerprint data matches the received fingerprint data.

9. The method as claimed in claim 8, wherein the pre-generated fingerprint data is generated by:
retrieving, from the storage, a cryptographic hash function associated with the first server;
retrieving, from the storage, a copy of the third digital certificate;
applying the cryptographic hash function to the retrieved copy of the third digital certificate, to generate fingerprint data corresponding to the third digital certificate; and
storing the generated fingerprint data as the pre-generated fingerprint data.

10. The method as claimed in claim 4, wherein the first digital certificate is a certificate chain or wherein the third digital certificate is a certificate chain.

11. The method as claimed in claim 1, further comprising:
receiving, from the first server, that requested the first digital certificate, a message indicating that first server has authenticated the client device.

12. The method as claimed in claim 1, wherein when the secure communication session is established, the method further comprises:
exchanging encrypted messages with the first server, that requested the first digital certificate.

13. The method as claimed in claim 12, wherein the established secure communication session is terminated when the exchanging of encrypted messages is completed or wherein the established secure communication session is terminated after a specified time period has lapsed.

14. A method of establishing a secure communication session between a client device and a first server, the method performed by the first server, comprising:
sending to the client device or receiving from the client device a communication to initiate a handshake process to establish the secure communication session and performing the handshake process with the client device, the handshake process comprising:

transmitting, from the first server, a request to the client device for a first digital certificate for authenticating the client device, wherein the client device comprises information provisioned by a second server indicating at least one cryptographic algorithm or cipher suite supported by the first server;

receiving, at the first server from the client device, a uniform resource identifier (URI) for the first digital certificate, wherein the URI comprises:
   a domain name of the second server from which the first digital certificate is obtainable;
   a client device identifier; and
   a server identifier for the first server;

retrieving, from the second server and by using the URI that identifies the domain name of the second server, the first digital certificate;

authenticating the client device using the first digital certificate;

transmitting, to the client device, a further URI, the further URI identifying a domain name of a resource remote from the client device from which a second digital certificate to authenticate the first server to the client device is obtainable;

completing the handshake process to establish the communication session after the client device and the first server are authenticated: and sending, to the client device, one or more communications during the communication session.

15. The method as claimed in claim 14, where authenticating the first digital certificate comprises:
   comparing the client device identifier in the retrieved first digital certificate with the received client device identifier;
   comparing the server identifier of the retrieved first digital certificate with a stored server identifier; and
   authenticating the client device if the client device identifier of the first digital certificate matches the received client device identifier, and if the server identifier of the first digital certificate matches the stored server identifier.

16. The method as claimed in claim 14, further comprising:
   receiving, from the client device, a request for a third digital certificate for authenticating the first server to the client device, the third digital certificate comprising the server identifier; and
   transmitting, responsive to the request, fingerprint data corresponding to the third digital certificate.

17. A first server for establishing a secure communication session with a client device, the first server comprising at least one hardware processor and/or a micro-processor configured to:
   send to the client device or receive from the client device a communication to initiate a handshake process to establish the secure communication session and to perform the handshake process with the client device, the handshake process comprising:
   transmit, to the client device, a request for a first digital certificate to authenticate the client device, wherein the client device comprises information provisioned by a second server indicating at least one cryptographic algorithm or cipher suite supported by the first server;
   receive, from the client device, a uniform resource identifier (URI) for the first digital certificate, wherein the URI comprises:
      a domain name of the second server from which the first digital certificate is obtainable;
      a client device identifier; and
      a server identifier for the first server;
   retrieve, from the second server and by using the URI that identifies the domain name of the second server, the first digital certificate;
   authenticate the client device using the first digital certificate;
   transmit, to the client device, a further URI identifying a domain name of a resource remote from the client device from which a second digital certificate to authenticate the first server to the client device is obtainable;
   complete the handshake process to establish the communication session when the client device and the first server are authenticated; and
   send, to the client device, one or more communications during the communication session.

* * * * *